United States Patent [19]

Becker

[11] Patent Number: 4,918,610

[45] Date of Patent: Apr. 17, 1990

[54] NAVIGATION, COMMUNICATION, AND SURVEILLANCE SYSTEM BASED ON DME

[75] Inventor: Alfred R. G. Becker, Braunschweig, Fed. Rep. of Germany

[73] Assignee: Deutsche Forschungs- und Versuchsanstalt für Luft- und Raumfahrt e.V., Cologne, Fed. Rep. of Germany

[21] Appl. No.: 324,319

[22] Filed: Mar. 16, 1989

Related U.S. Application Data

[63] Continuation of Ser. No. 137,958, Dec. 24, 1987, abandoned, which is a continuation of Ser. No. 772,635, Sep. 5, 1985, abandoned.

[30] Foreign Application Priority Data

Sep. 7, 1984 [DE] Fed. Rep. of Germany ....... 3433364

[51] Int. Cl.$^4$ ............................................. G01S 13/76
[52] U.S. Cl. ...................................... 364/451; 342/47
[58] Field of Search .............. 364/443, 449, 451, 460, 364/461; 342/29, 30, 32, 36, 38, 50

[56] References Cited

U.S. PATENT DOCUMENTS

| | | | |
|---|---|---|---|
| 3,766,552 | 10/1973 | Hajduk | 342/30 |
| 3,808,598 | 4/1974 | Carter | 364/451 |
| 3,866,229 | 2/1975 | Hammack | 364/451 |
| 4,380,050 | 4/1983 | Tanner | 364/461 |
| 4,583,177 | 4/1986 | Meyer | 364/451 |
| 4,599,617 | 7/1986 | Stolpman | 343/7.3 |
| 4,642,639 | 2/1987 | Nelson | 342/47 |

Primary Examiner—Parshotam S. Lall
Assistant Examiner—Thomas G. Black
Attorney, Agent, or Firm—Gottlieb, Rackman & Reisman

[57] ABSTRACT

The distance measuring Equipment (DME) is a well-approved means for short range navigation in international civil aviation. It utilizes the inherent capacity of the system in most applications to a relatively small degree. Therefore, additional functions can be integrated into the system such as data links, ground derived slant range measurement equipment and direction finders (growth potential). Thus, the DME can be extended to an Integrated Navigation, Communication, and Surveillance System. This system may be superior by technical, as well as by economical and operational reasons, to conventional solutions, which use separate systems for the different functions. The integrated system can be composed in different ways using different sets of the DME growth elements. A promising set is described and applied to a scenario of helicopter operations with oil rigs.

5 Claims, 7 Drawing Sheets

Ⓦ CODING WINDOW "DATA WORD IDENTIFICATION"
Ⓘ CODING WINDOW "DATA WORD INFORMATION"

NAVIGATION, COMMUNICATION, AND SURVEILLANCE SYSTEM BASED ON DME

This application is a continuation of application Ser. No. 137,958 filed Dec. 24, 1987, which in turn is a continuation of application Ser. No. 772,635 filed Sept. 5, 1985 and now abandoned.

FIELD OF THE INVENTION

The invention relates to a navigation, communication, and surveillance system based on DME.

DESCRIPTION OF THE PRIOR ART

In the international civil aviation the tasks of navigation, communication and surveillance are supported by different systems like VOR, NDB, DEM, ILS, SSR*. These systems are standardized by the ICAO and are in worldwide use. Further systems like MLS and DME/P will be introduced in the near future.

These systems are well-proved and the high degree of safety in todays civil aviation results from the reliability of the equipments and the large amount of knowledge gained in their operations. However, the provision of a lot of different systems for different phases of a flight cannot be the optimum solution, for they are useless in some phases, but they still occupy weight, space and power. On the other hand, integrated systems use the same components like transmitters, receivers, antennas for as many functions as reasonable. Thus, weight, space and power consumption as well as cost can be reduced considerably. For reliability reasons, however, key components should be built up in a redundant configuration in order to prevent a breakdown of the total integrated system when one component fails.

The advantages of integrated systems show up especially for those applications where international standardization is not mandatory and where the burden of expensive installations already in use which have to be amortized does not exist. This is the case in large developing countries which only can be made accessible by a national net of airtraffic. Another potential application is the helicopter traffic with oil rigs in the ocean.

Several investigations in the past proved the DME to be a promising base for an integrated system.

The DME is a well-proved component of air navigation systems and is introduced and standardized internationally since 1959. The standards now are extended to the DME/P which is a component of the new MLS. DME as well as DME/P will still be used far beyond the year of 2000.

It is well known that in most applications the pulse space of the DME is only used to a small degree. Therefore, additional functions can be integrated into the system by inserting further pulses into the pulse format. These pulses can be modulated with the desired information (e.g. by pulse position modulation).

Therefore the DME is capable for further development or growth. So additional functions can be obtained without loss of the compatibility with the standard DME. Some of these additional functions such as the measurement of the azimuth angle are realized with the DLS and DAS already. The azimuth angle up to now is obtained by means of ground azimuth direction finders using special azimuth antennas.

It is an object of the invention to provide an integrated navigation communication and surveillance system based on the standard DME and operating without requiring a ground azimuth direction finder.

SUMMARY OF THE INVENTION

This object is solved by an integrated surveillance system using a Three Way DME receiving on the third way from the aircraft together with a second coded signal at least the information of the altitude and identification of the aircraft. By ground measuring of the slant range from at least two, preferably three or even more ground stations the position of the aircraft can be calculated by means of a computer fed with the at least two slant range measurements and the altitude of the aircraft. At least one ground station is to be fully equipped for Three Way DME. One such Three Way DME ground station can be combined with at least one sub-station being a receiver for the third way signal only which is transmitted via a broad-band channel link to a central station where a computer is installed by which the slant range from the sub-station is calculated by subtracting the travel time of the signal on the broad band link from the total travel time and further the position of the aircraft from the slant ranges and the altitude transmitted from the aircraft. In an embodiment with at least two Three Way DME stations the slant ranges are directly determined for and by each of these stations and the slant ranges are transmitted together with the identification and altitude of the aircraft via data lines to a computer by which the position is calculated from the slant ranges and the altitude transmitted from the aircraft.

BRIEF DESCRIPTION OF THE DRAWINGS

The invention is illustrated by way of example in the accompanying drawings and is described in detail in the following with reference to the drawings, in which.

DESCRIPTION OF THE PREFERRED EMBODIMENTS

An Integrated Navigation, Communication, and Surveillance System which will be defined below makes use of the following DME growth elements.

| | |
|---|---|
| Three-Way DME | (TW-DME) |
| Trilateration Three-Way DME | (TTW-DME) |
| Air to Ground Selective Data Link | (A/G-SDL) |
| Ground to Air Selective Data Link | (G/A-SDL) |

| -continued | |
|---|---|
| Broadcast Data Link | (BDL) |

The Three Way DME provides the slant range information on board the aircraft as well as on the ground. The principle is shown by FIG. 1 while the signal format can be taken from FIG. 2.

Figure 1:
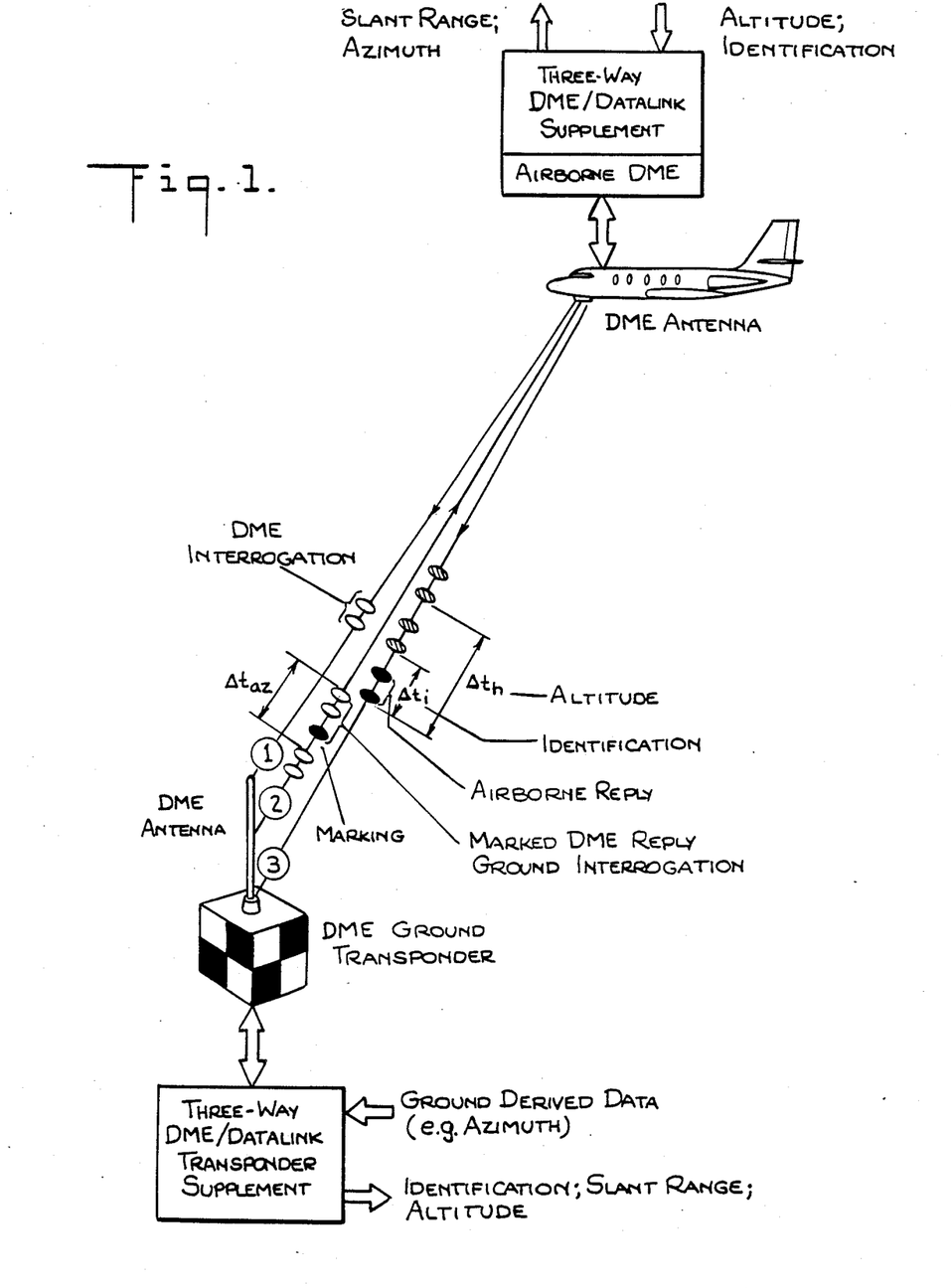
FIG. 1 shows the principle of a Three Way DME with integrated air→ground and ground→air selective data links.

In FIG. 1 the airborne DME interrogates the ground transponder (way ①). The ground transponder transmits a reply pulse pair back to the aircraft (way ②). Thus, the pulse travel time which is proportional to the slant range, can be measured on board the aircraft. This, shortly, explains the function of the standard DME. In the case of the TW-DME, however, the reply pulse pair is supplemented by a third pulse, the so-called marking pulse. Simultaneously a time counter is started on the ground. When the on-board equipment detects the marking pulse the airborne transmitter is caused to transmit a further pulse pair (way ③). After detection in the groundstation the counter is stopped. Thus, the slant range information also is available on the ground. In order to distinguish between the pulse pair of the first way and the pulse pair of the third way the pulse spacing is different. A replay of the transponder to a received pulse pair only will be initiated by the ICAO standardized pulse spacing on the first way. Thus, also the compatibility with the standard DME is maintained.

Figure 2:
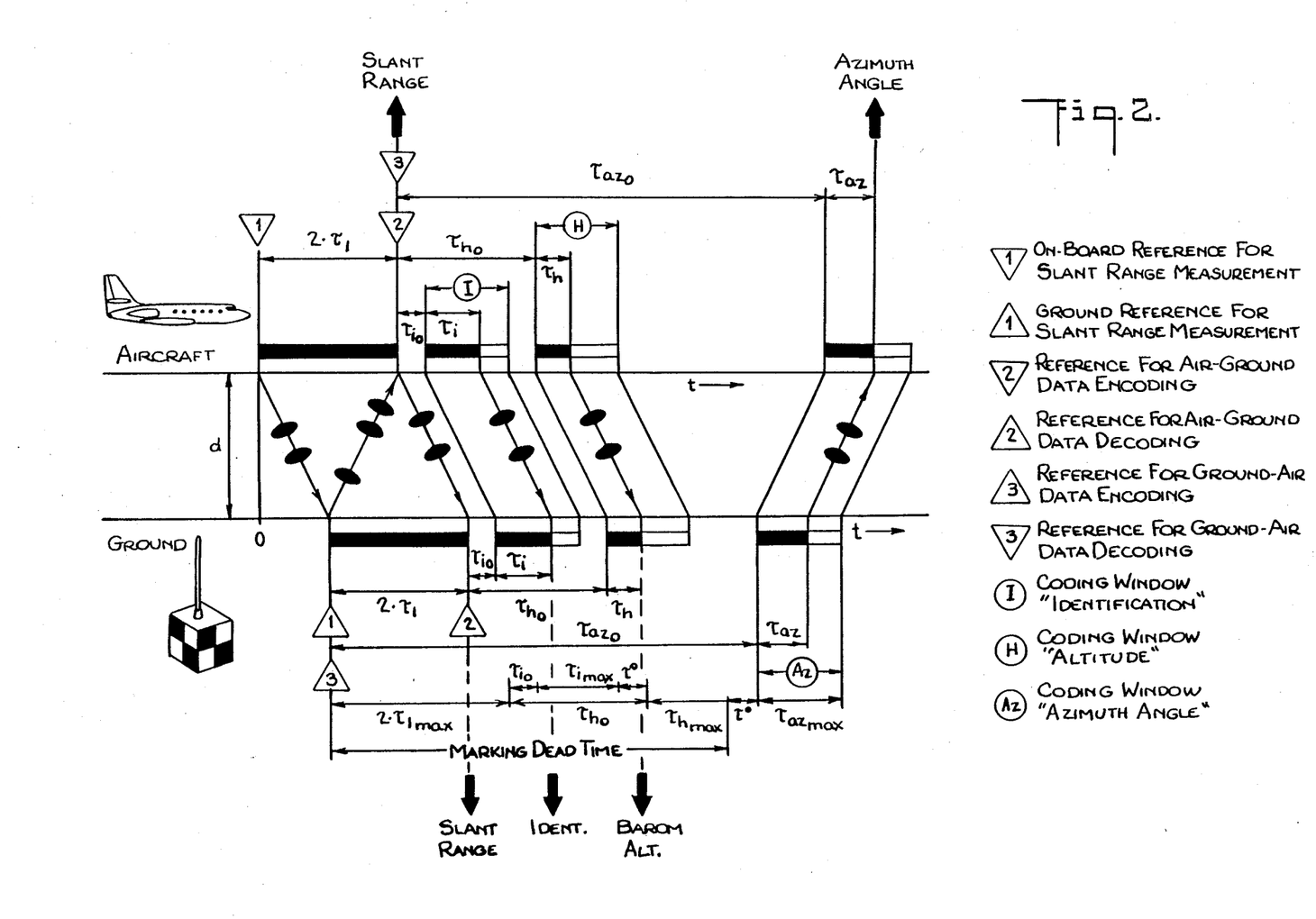
FIG. 2 shows the signal format of the Three Way DME with integrated air→ground and ground→air selective data links.

The signal format of the TW-DME can be taken in a simplified form from FIG. 2. The events on board and on the ground are plotted in correlation. The horizontal axis is the time axis. The transmitting time ▽ of the airborne interrogation is the reference for the on-board pulse travel time measurement. The pulse pair arrives on the ground after the time intervall $\tau_1$. △ is the reference for the travel time measurement on the ground. The ground station transmits the reply pulse pair (standardized fixed delays are neglected in FIG. 2) and adds the marking pulse after approximately 50 μs. When the pulse pair arrives on board the time measurement is stopped and the slant range information can be read out for further processing and display. After rerecognition of the marking pulse the airborne equipment again transmits a pulse pair. A certain time interval is needed for detection of the marking pulse. Like on the ground a fixed time delay must be applied before the third way is initiated. This delay is suppressed in FIG. 2 for simplification.

As already explained this pulse pair must have a larger spacing. When it arrives on the ground the time measurement is stopped. The slant range information can be read out for further processing.

In order to avoid confusion between slant range mesasurements on the ground for several aircraft a marking dead time must be introduced. During this dead time the received interrogations cause a reply pulse pair but no marking pulse. By this means a reception of a third way pulse pair of another aircraft is prohibited. The marking dead time of the TW-DME alone must be $2 \cdot \tau_{1\ max}$ which is the pulse travel time at the maximum possible distance of the aircraft. FIG. 2 also shows the position of the coding windows of the incorporated data link which are explained in the following. Obviously, confusion also occurs when the data pulses of different aircraft are intermixed. Therefore, the marking dead time must be enlarged accordingly.

The signal front of the TW-DME is compatible with that of the standard DME. That means: an aircraft fitted with a standard on-board DME will get the standard DME service by the TW-DME. However, for obtaining the additional surveillance service, a TW-DME airborne equipment must be installed.

Obviously, the TW-DME uses the transmitters, receivers and antennas of the airborne equipment as well as those of the ground equipment. Only the control logic must be extended. On the ground the time counter and its associated peripherie must be provided. By economical reasons these functions should be integrated into the airborne DME and the DME ground transponder. However, when supplements to the standard DME equipments are used, as it is supposed in FIG. 1, additional hardware must be spent for the supplements in order to minimize interface problems. Though considerably more components are needed this configuration is superior in case of experimental equipment or in case of low production quantities. Then, the standard DME equipment can be used without the need of developing completely new hardware.

The Trilateration Three-Way DME (TTW-DME) is an extension of the TW-DME. It has the capability of multiple slant range measurements from the ground and thus the capability of a complete position determination of the aircraft by trilateration. The principle can be taken from FIG. 4. Between the aircraft and the ground central station a TW-DME connection is established. The three ways are indicated by ①, ② and ③₁. In addition two substations are positioned at exactly known locations having the distances $a_1$ and $a_2$ from the central station. These subsystems mainly consist of a DME receiver which is tuned to the third way of the TW-DME. Thus, the pulse pairs of the third way not only generate trigger pulses in the ground central station but also in both substations. These trigger pulses are transmitted by a wide band r.f. link to the central station. The pulse travel time measurements from the ground now can be made via three different ways The measurement (a) provides the slant range $d_1$. The measurements (b) and (c) can be used for the determination of $d_2$ and $d_3$, respectively, by regarding the known distances $a_1$ and $a_2$. From these slant ranges the position of the aircraft (with respect to all three coordinates) can be calculated.

It is well-known that with trilateration the z-coordinate of the aircraft at low elevation angles only can be obtained with a poor accuracy. Therefore, a direct measurement of the altitude (barometric or radio) is provided on board of the aircraft. This altitude is transmitted to the ground by a data link (see below).

Now a redundant set of measurements is available on the ground for evaluation of the position coordinates of the aircraft. The obtained accuracy primarily depends on the accuracy of the slant range measurements.

The standard deviation ($\sigma_x$; $\sigma_y$) of the position error in x/y-coordinates within the triangle formed by the three stations is in general smaller than the standard deviation of the error of a single slant range measurement.

Outside the triangle, at large ranges, the error behavior can better be expressed in polar coordinates $(\rho,\theta)$. The standard deviation $\sigma_\rho$ again is smaller than the standard deviation of a single slant range measurement while the lateral position error increases linearly with the range. That means, however, that the error in angular terms is constant. The standard deviation $\sigma_\theta$ depends on the standard deviation of the slant range measurement as well as on the base length of the triangle. Assuming an equilateral triangle with the ground station at the corners the following equation is a good approximation at large ranges.

$$\sigma_\theta = \frac{180}{\pi} \cdot \sqrt{2} \cdot \frac{\sigma_R}{a}.$$

where $\sigma_R$ is the standard deviation of a single slant range measurement and where a is the base length. $\sigma_\theta$ is obtained in degrees, For $\sigma_R = 100$ m and $a = 8$ km one obtains $$\sigma_\theta \approx 1°$$

Figure 4:
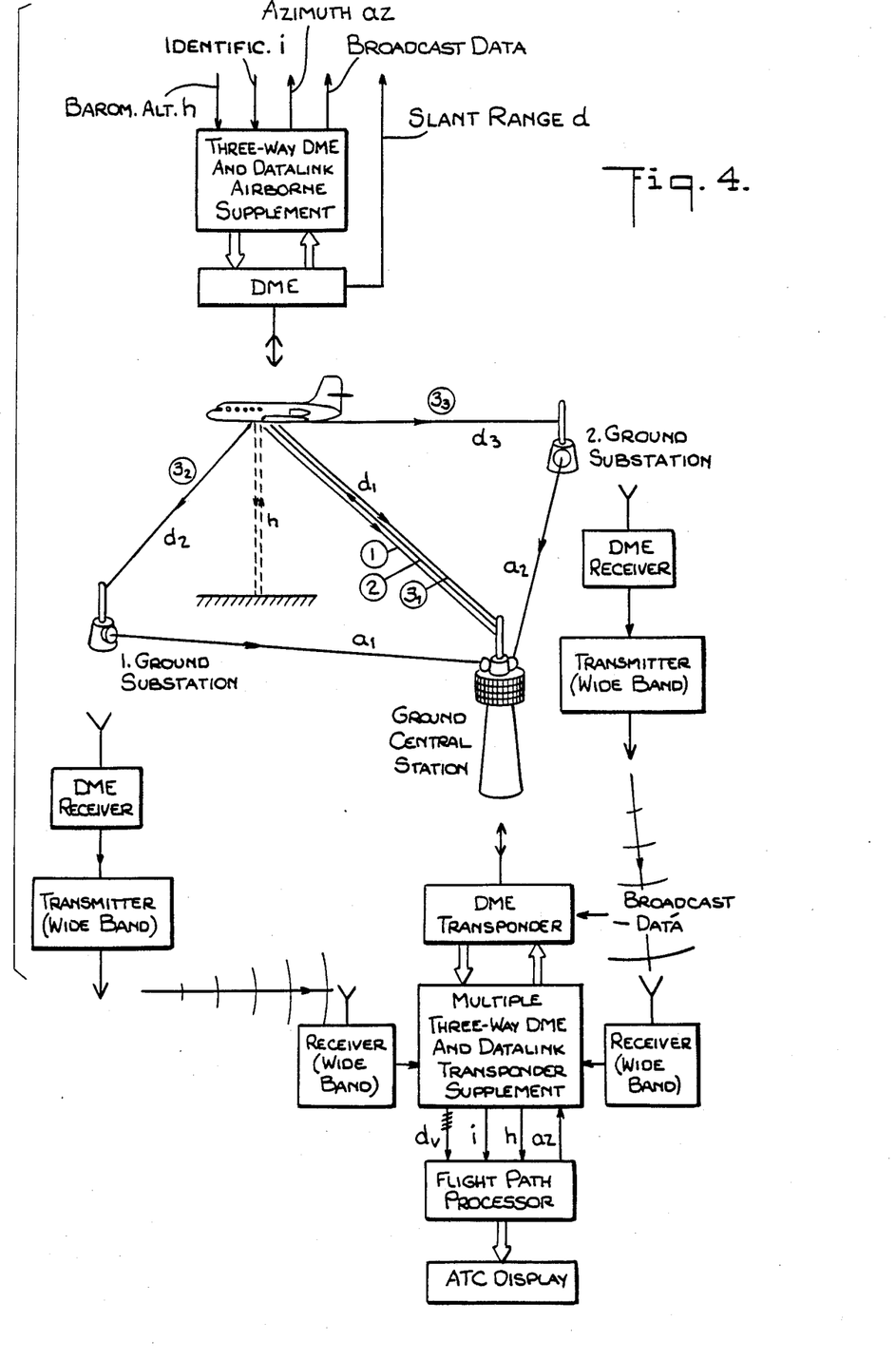
FIG. 4 shows the principle and block diagram of the integrated navigation, communication, and surveillance system (INCS) on the basis of the Trilateration Three Way DME.
Figure 5:
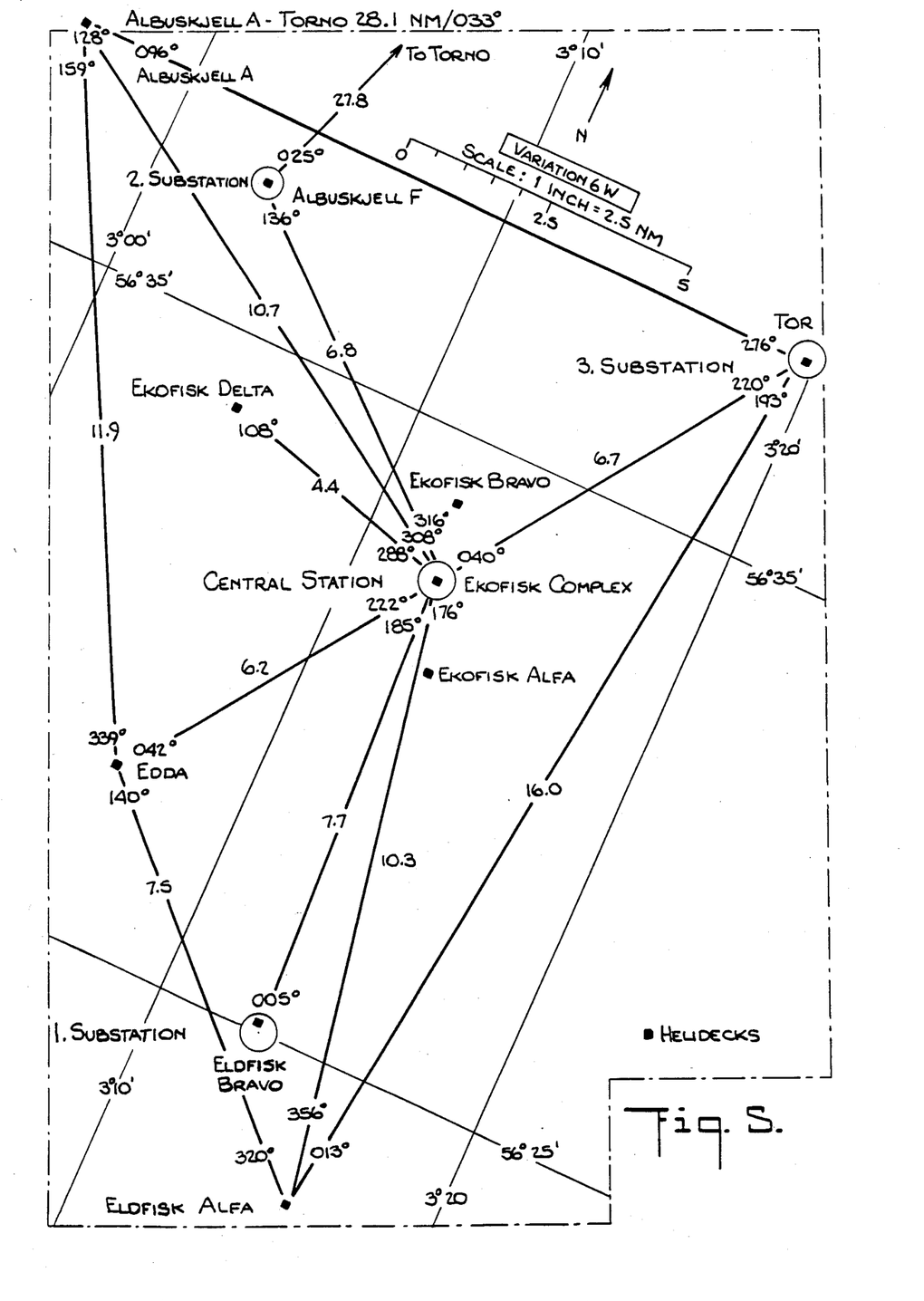
FIG. 5 shows the installation of the INCS in the off-shore oil area "Ekofisk".

In FIG. 4 one central station and two substations are used. This configuration already provides a redundant position determination. For further improvement of the integrity of the system a third substation can be provided. Then errors which are caused by antenna shadowing or multipath wave propagation can considerably be reduced. In FIG. 5 a configuration utilizing one central station and three substations is chosen.

The Air to Ground Selective Data Link (A/G-SDL) is intended to transmit data from an individual aircraft to the ATC centre on the ground. The applied principle and the signal format also are presented in FIG. 1 and in FIG. 2, respectively. In FIG. 1 the altitude and the identification code of the aircraft are shown to be transmitted to the ground. This is done by pulse position modulation. Two additional pulse pairs are needed at the downlink (way ③) which are used as carriers for the two informations to be transmitted. The airborne reply ② of the TW-DME is used as a time reference for the pulse position coding. The signal format is presented in FIG. 2. Two coding windows are assigned to the two informations where ② is used as the time reference. ① and ⑪ constitute the coding windows for the identification information and for the altitude information, respectively. At the ground the corresponding time reference is ②. The decoding windows are placed within the frame in the same relative position as on board. The corresponding coding informations are $\tau_i$ and $\tau_h$ which represent the identification and the altitude, respectively. At those points of time which are marked by ↓ in FIG. 2 the measured or transmitted data are available on the ground for further processing.

The Ground to Air Selective Data Link (G/A-SDL) is intended to transmit data from the central station on the ground to an individual aircraft. The principle corresponds to that of the A/G-SDL described before. It also is illustrated by FIG. 1 and FIG. 2. In both figures only one information is shown to be transmitted by this data link. This is the azimuth angle which is calculated from the ground position measurements. Obviously, this principle of data transmission can be extended to more data if needed.

From FIG. 1 the encoding principle becomes obvious. The DME reply of the ground transponder is followed by a further pulse pair the time delay $\Delta t_{az}$ of which encodes the azimuth information to be transmitted. In FIG. 2 the signal format is shown in some more detail. The coding window is referenced to the point of time ③. Accordingly, the decoding window on board is referenced to ③. The fixed time interval $\tau_{az\,0}$ which determines the beginning of the azimuth coding window must be chosen sufficiently wide. Even at the largest specified slant range an overlapping with the decoding windows of the A/G-SDL must not occur. The transmitted azimuth angle can be decoded on board at the assigned point of time for further processing.

One inherent problem of the G/A-SDL shall be discussed shortly. The data pulse pairs are applied to the second way of the DME or of the TW-DME. The transponder reply pulse pair is the reference for the pulse position coding. As the ground transponder operates with a more or less high number of aircraft the association of a received airborne interrogation pulse pair to the interrogating aircraft is not possible without further information. Therefore, the ground data assigned to the interrogating aircraft cannot be identified and coded. In the case of the DLS[1] as well as the DAS[4] this problem did not take effect because the information to be transmitted to the aircraft was developed from the interrogating pulse itself namely the azimuth angle and the elevation angle of the received radio frequency wave front. This information was available a few milliseconds after reception of the interrogation before the beginning of the coding windows of the G/A-SDL. Thus, the informations azimuth and elevation can be correctly transmitted without the need of identifying the assigned aircraft. But other informations not physically related to the received interrogation could not be transmitted with those systems. The situation changes, however, when a A/G-SDL is incorporated in the system. From FIG. 2 it can be taken that the interrogating aircraft is already identified on the ground when the coding window of the G/A-SDL begins. Thus, any data can be transmitted to the assigned aircraft.

Figure 3:
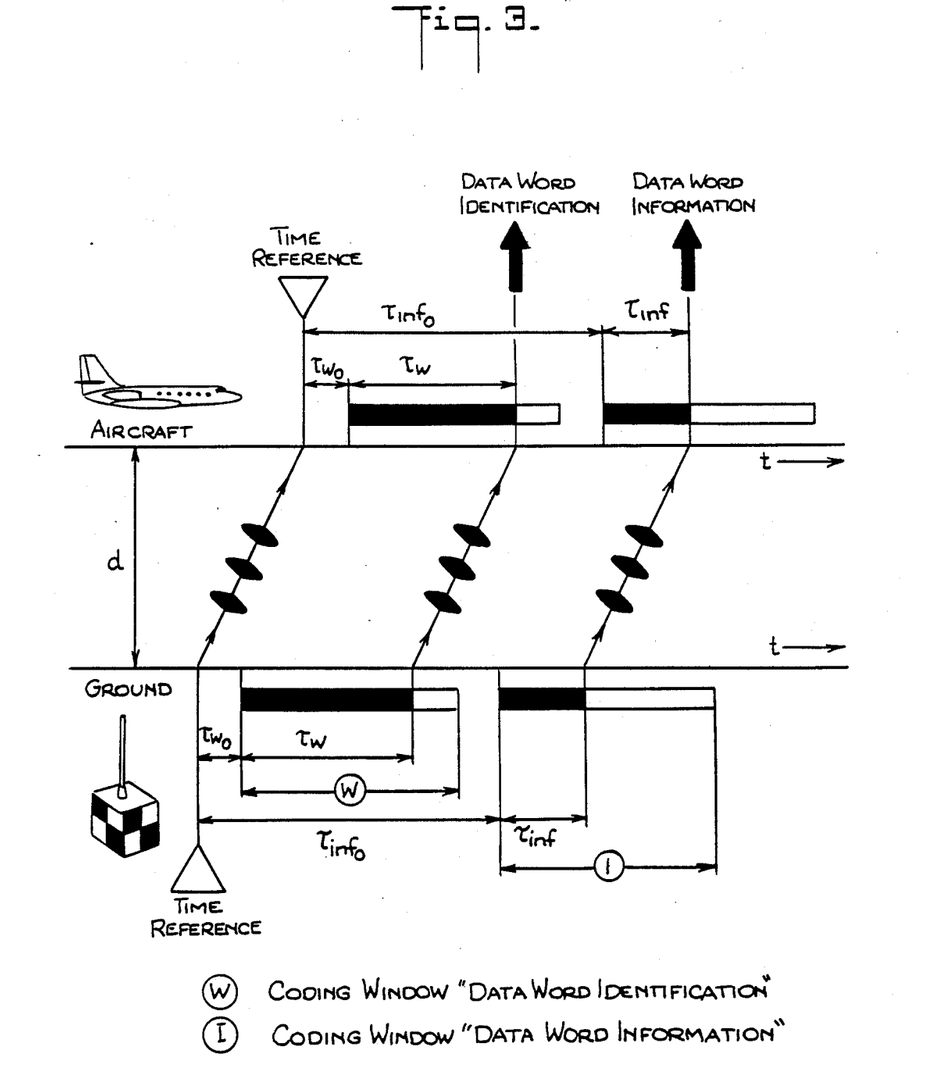
FIG. 3 shows the signal format of the ground→air broadcast data link.

The Ground to Air Broadcast Data Link (G/A-BDL) provides all aircraft served by the groundstation (ATC-centre) with the same set of data which is useful for aircraft operations (e.g. wind direction and wind speed at the airport, identification of runway in use, status of navigational ground equipment, geographical coordinates of the ground station). The principle and the signal format of the G/A-BDL is illustrated by FIG. 3. The coding of the information to be transmitted is performed in two steps coding of the data word identification
coding of the data word information Both codings are performed by position modulation of pulse triplets. By the use of pulse triplets instead of pulse pairs the pulses can be identified on board as coding elements of the G/A-BDL very easily.

The transmission of a data word is started with the transmission of a time reference pulse triplet. After a short time interval $\tau_{wo}$ the coding window for the data word identification begins. Within this window a second pulse triplet is transmitted, the position of which carries the word identification. In order to get a reliable decoding of adjacent positions the coding is performed in relatively coarse steps of 4 μs. Even under noisy conditions the decoding can be done with a very low error probability. By use of a coding window width of 400 μs it can be distinguished between 100 different word identifications. A second coding window is provided for the information contents of the data word. The position of a third pulse triplet is placed within this window according to the data value. When the same low error probability shall be obtained the same width of the coding steps must be applied. Thus, a coding window width of another 400 μs allows for 100 information steps. For reasons of hardware simplifications the following regulations for the pulse spacing of the pulse triplets are reasonable the pulses are equally spaced the spacing corresponds to the mode of the DME channel.

The Integrated Navigation, Communication, and Surveillance System (INCS)

This system comprises the different functions which are separately described in chapter II. The INCS is illustrated by FIG. 4. The Trilateration Three-Way DME (TTW-DME) is combined with the Air to Ground Selective Data Link (A/G-SDL) and the Ground to Air Selective Data Link (G/A-SDL) and the G/A-Broadcast Data Link.

FIG. 2 still represents the signal format. However, the ground measurement and decoding part (slant range, identification, barometric altitude) must be triplicated corresponding to the three downlinks $(3_1)$ $(3_2)$ and $(3_3)$. The Ground to Air Broadcast Data Link (G/A-BDL) is also integrated into the DME transponder and the correspondent airborne equipment.

The chosen configuration, utilizing one central station and two substations provides a certain degree of redundancy, already. However, with bad environmental conditions e.g. shadowing of the radiated wave in certain sectors by obstructions, the use of a further substation may be advisable. On the other hand, the Air to Ground Selective Data Link becomes very reliable anyhow. It is n-fold redundant when n substations are used (space diversity transmission).

The INCS provides the following informations:
on board
  slant range aircraft—central station
  azimuth angle with reference to the central station
  broadcast ground information
on ground
  slant ranges—related to the central station—of all aircraft
  slant ranges—related to the substations—of all aircraft
  identifications of all aircraft
  barometric altitudes of all aircraft From these informations available on the ground the flight track of all suitable equipped aircraft within the service volume of the central ground station can be calculated and then displayed in the usual way on an ATC display. Moreover, the azimuth angles of all aircraft can be calculated on the ground and transmitted back to the aircraft by the Ground to Air Selective Data Link.

In FIG. 4 a simplified block diagram of the INCS is given also. On board the DME equipment is supplemented by the Three-Way DME and data link airborne supplement. This arrangement is advantageous when standard DME equipment shall be used. A special integrated equipment would be less complex, however, the development cost only will pay off at sufficient production quantities.

On the ground the DME transponder is located in the central station. It is supplemented by the Three-Way DME and data link transponder supplement. Again, an integrated version would become advantageous at sufficient production quantities only. In contrary to the basic system shown in FIG. 1 a multiple slant range measurement as well as a multiple data decoding must be performed in the INCS. Thus, a different supplement has to be applied.

The measured and decoded data (i.e. three slant ranges, identification and barometric altitude) of each aircraft are fed from the supplement to the flight path processor where the aircraft position of minimal error is calculated. From these positions the azimuth angles of all aircraft are calculated and fed back into the supplement. Here they are coded as shown in FIG. 1 and FIG. 2 and then transmitted to the aircraft via the transponder.

The subsystems mainly consist of a DME receiver which is tuned to the third way transmissions of the aircraft. The trigger pulses at the output of the receivers are transmitted through the wide band data links to the central station and fed into the transponder supplement. Here they stop the respective time measurement devices. The decoded slant ranges and data are processed in the flight path processor.

From theoretical and experimental investigations the following performance of the INCS can be expected.

Coverage: The coverage of the INCS is hemispherical for the navigation function as well as for the surveillance function. Only right above the central station a cone of silence must be expected because of the high attenuation of the antenna pattern of the central station in vertical direction. The cone of silence of the substation, however, does not cause any problems because of the redundancy in the set of measurements. Therefore a short interruption of the reception of an substation can be tolerated. It must be supposed, however, that the direct path between the aircraft and the ground central station is not shadowed by obstacles in any direction. This shadowing can be avoided by mounting the transponder antenna on the top of a tower. On the other hand the propagation paths via one or more substations may be shadowed for a certain time at certain directions. The track on the ground, however, will not be lost because of the redundant slant range measurements and the redundant air to ground data transmission. The same is true for the navigation information on board.

Accuracy: The position accuracy on the ground can roughly be described by defining two different sections. This was done, already, above in the course of the description of the TTW-DME.

It was found that the accuracy in x,y-coordinates within the area which is limited by the straight lines connecting the ground stations is better than the accuracy of the DME. This is true because of the overdetermination of the range measurements and because of the filtering gain within the flight path processor. The accuracy of the z-coordinate at low elevation angles is limited by the accuracy of the barometric altitude. In this case the z-component is very inaccurate. However, when a high elevation angle occurs at any ground station the accuracy of the z-coordinate, calculated from the slant range measurements, approaches that of the DME. Thus, this calculated coordinate can be used for correction of the zero-offset of the barometric altitude.

When the position of the aircraft is far outside the area defined above, the system behaves like a $\rho/\theta$-system as radar, VOR and ILS. The distance error again is smaller than that of a single DME measurement by about 20%. The angular accuracy depends on the base length between the ground stations (see example in subchapter TTW-DME).

The position accuracy on board is slightly worse compared to the accuracy on the ground. The lateral accuracy which corresponds to the accuracy of the transmitted azimuth angle is the same as on the ground. The range measurement, however, is performed by the single air derived measurement of the on-board DME only.

Update rate: It is well known from the DME that at high interrogation rates of the ground transponder the reply rate is reduced to a certain extent. This situation is given at high traffic situations when a large number of aircraft interrogate the ground station. There are different reasons for this reduction, e.g. dead times in the system and pulse distortion by pulse overlapping. Other DME-based systems like DLS and DAS also are subject to this effect. In the case of the INCS another effect contributes to the reduction of the measuring rate, especially on the ground. For the slant range measurement on the ground a marking dead time is provided (see FIG. 2). Interrogations from other aircraft arriving during this time interval at the ground transponder in most cases will initiate a reply pulse pair but never will be supplied with a marking pulse. Thus, a slant range measurement on the ground is not possible for these other aircraft. This mechanism causes a further reduction of the update rate on the ground. A detailed investigation resulted in the following:

| | |
|---|---|
| number of aircraft served by the ground station | 20 |
| average airborne interrogation rate | 16/s |
| average airborne reply rate | 15/s |
| average rate of slant range measurements on ground | 8,4/s |

Obviously, the reduction of the airborne update rate is negligible. The ground rate, however, is considerably reduced but it sill remains more than 50% of the airborne interrogation rate. The ground rate is well above the minimum update rate of 5/s which usually is required for navigational measurements. This limit must be maintained, when the navigational information is to be fed into the automatic flight control system. With respect to the surveillance function the situation is even more advantageous. In comparison to the low update rate (i.e. 0.25/s) of the conventional secunary radar system (SSR) which is the international surveillance system, this rate is higher by a factor of 34. Therefore, a good flight path tracking on the ground can be obtained even with quick manoeuvres.

Potential Application of the INCS for Helicopter Operations with Oil Rigs

The conventional systems used for the navigation and the surveillance task are NDB, VOR, DME and SSR, respectively. These systems are in worldwide use and standardized by the ICAO. In comparison to these systems the INCS incorporates potential advantages, by technical as well as by operational and economical reasons, e.g.

higher update rate of the surveillance measurements
higher accuracy because of redundant measurements
good integrity because of redundant measurements
one system only in use during the mission; no switching and tuning of different units
considerable savings of equipment cost and installation cost on board as well as on ground These advantages mainly will become effective for new applications where ICAO-standardized systems are not installed, already. Here, the need of amortization of the invested capital does not exist. Potential users are, e.g.

developing countries with large areas which only can be explored by national air connections
helicopter operations with oil rigs.

The latter application shall be demonstrated by the Norwegian Ekofis-scenario which is located in the North Sea about 150 NM from the coast. The oil rig area is shown in FIG. 5. The system to be installed shall cover a Terminal Manoeuvring Area (TMA) of 40 NM radius around the central platform (see FIG. 6).

The central station of the INCS preferably would be installed on the top of the central platform, being a large hotel platform. Thus, a reliable r.f. connection to all helicopters within the coverage can be provided. Three substations are proposed at the indicated locations. For redundancy and coverage reasons one more station is taken than in FIG. 4.

Assuming that a helicopter approaches a helideck at the periphery of the oil rig area, e.g. Albuskjell A, the r.f. connection to the substation Eldfisk Bravo (see FIG. 5) may break down. Nevertheless a sufficient redundancy remains.

The task of the INCS is to guide the helicopter to a position about 0.5 NM away from the helideck at a minimum height of 200 ft. The approach and landing procedure will be performed visually.

If, in an intermediate stage, a more precise navigation information should be required for the approach close to the helideck the INCS must be extended accordingly. This could be done by installation of a DME/P on each helideck in combination with azimuth and elevation sensors similar to those used for DLS. The azimuth and elevation angles, measured on the ground, will be transmitted to the helicopter via the Ground to Air Selective Data Link. The on-board equipment is the same as for the INCS, however, the DME must incorporate the DME/P capability. Furthermore, an additional decoding window for the elevation information must be provided.

Another phase of the helicopter operations (en-route phase) covers the flights between the helicopter base Forus at the Norwegian continent and and the Ekofisk area (see FIG. 6) The flight distance is about 150 NM. For the navigational part the use of $\rho$-$\rho$-navigation in one proposal. Two DME-transponders should be positioned on mountains at the coast about 200 km apart. The use of two DME measurements only was found to be acceptable. The ambiguity of the position determination can easily be solved by using in addition the SOLA VOR/DME. Outside the usable range of this VOR/DME both intersections of the DME position circles are wide apart. Thus, a confusion is not to be expected.

The replacement of this system by the INCS will additionally provide the surveillance function. The INCS, however, must be modified to a certain extent. At first, the scanning principle must be applied. This principle is well known in DME techniques. Two or more DME channels are scanned on board consecutively. Thus, the on-board equipment interrogates two or more DME transponders, thus performing the slant range measurements to these ground stations. The only hardware modification of the INCS on board is the use of a scanning DME instead of a conventional DME. Secondly, the installation of a ground to ground wide band data channel between the substation and the central station may become difficult over large distances. Regarding the configuration of the INCS shown in FIG. 4 it is obvious to put the central station at Forus airport and to put the two substations on the mountains Stovegolv and Kaldaskniben. (see FIG. 6). However, the ground to ground wide band data links from the substations to the central station have to cover a range of more than 100 km. Line of sight conditions, therefore, cannot be expected. Further, the maximum travel time will be increased by the travel time along the ground links. The marking dead time (see FIG. 2) must be increased accordingly which results in a corresponding reduction of the update rate of the ground position determination. However, a superior solution is the following. The ground stations on both mountains consist of a complete Three-Way-DME transponder. The measured slant ranges as well as the decoded identification and altitude informations are transmitted via telephone cables to the ATC centre Forus. Here, the flight path processing and the surveillance is done. Moreover, the SOLA DME should be attached with a TW-DME supplement. Thus, the position determination can be accurately performed on the ground all over the en-route coverage region. The calculated azimuth angle with reference to Forus is transmitted back to all transponders and fed into the corresponding Ground to Air Selective Data Links. Thus, a very reliable data transmission in both directions is established (frequency diversity and space diversity).

Figure 6:
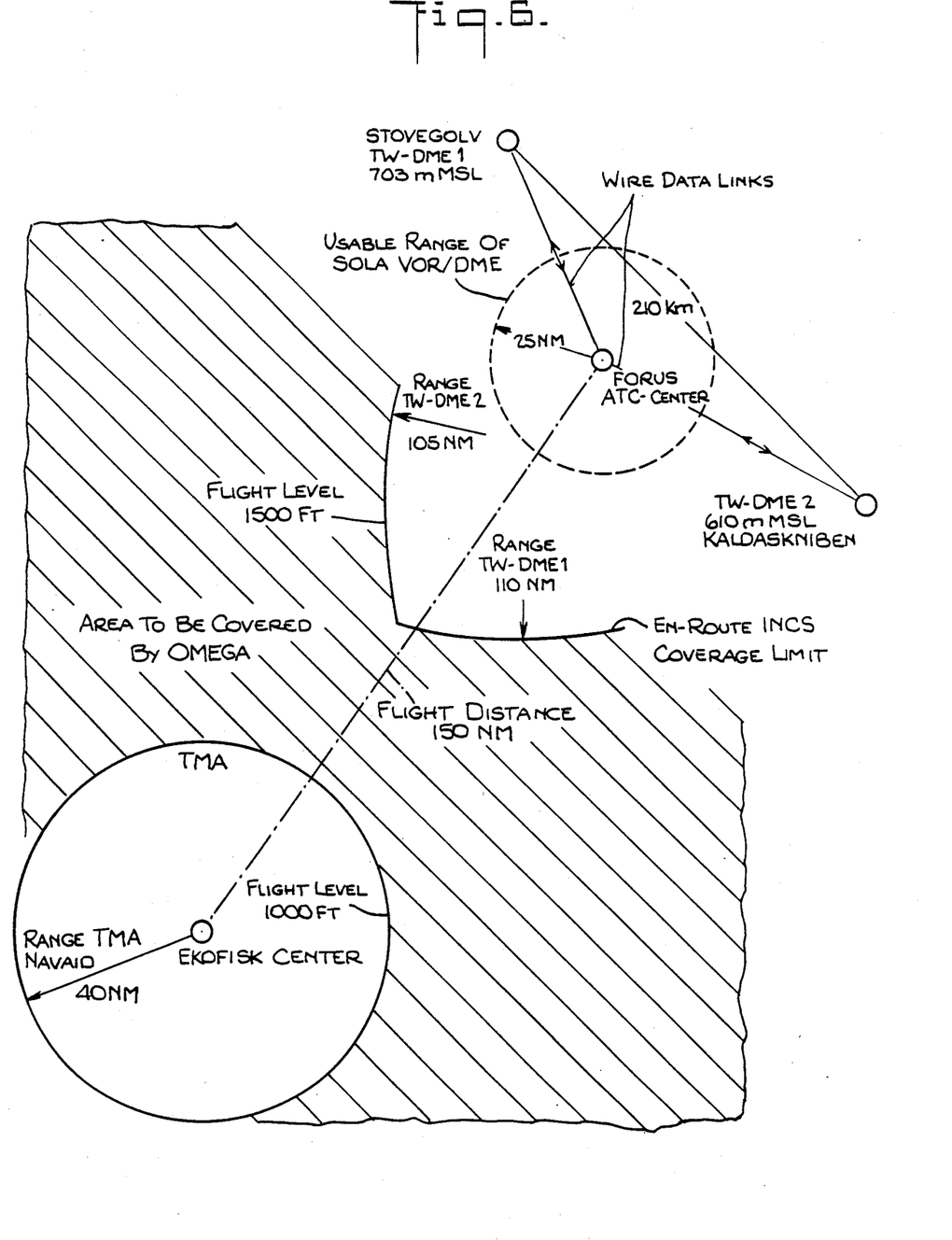
FIG. 6 shows the coverage of the proposed INCS in the "Ekofisk" scenario.

In FIG. 6 a coverage gap between the en-route INCS and the TMA INCS is indicated. In this region reliable service can not be guranteed. The navigation function, however, can be supported by the OMEGA navigation aid with lower performance which is used today already.

Figure 7:
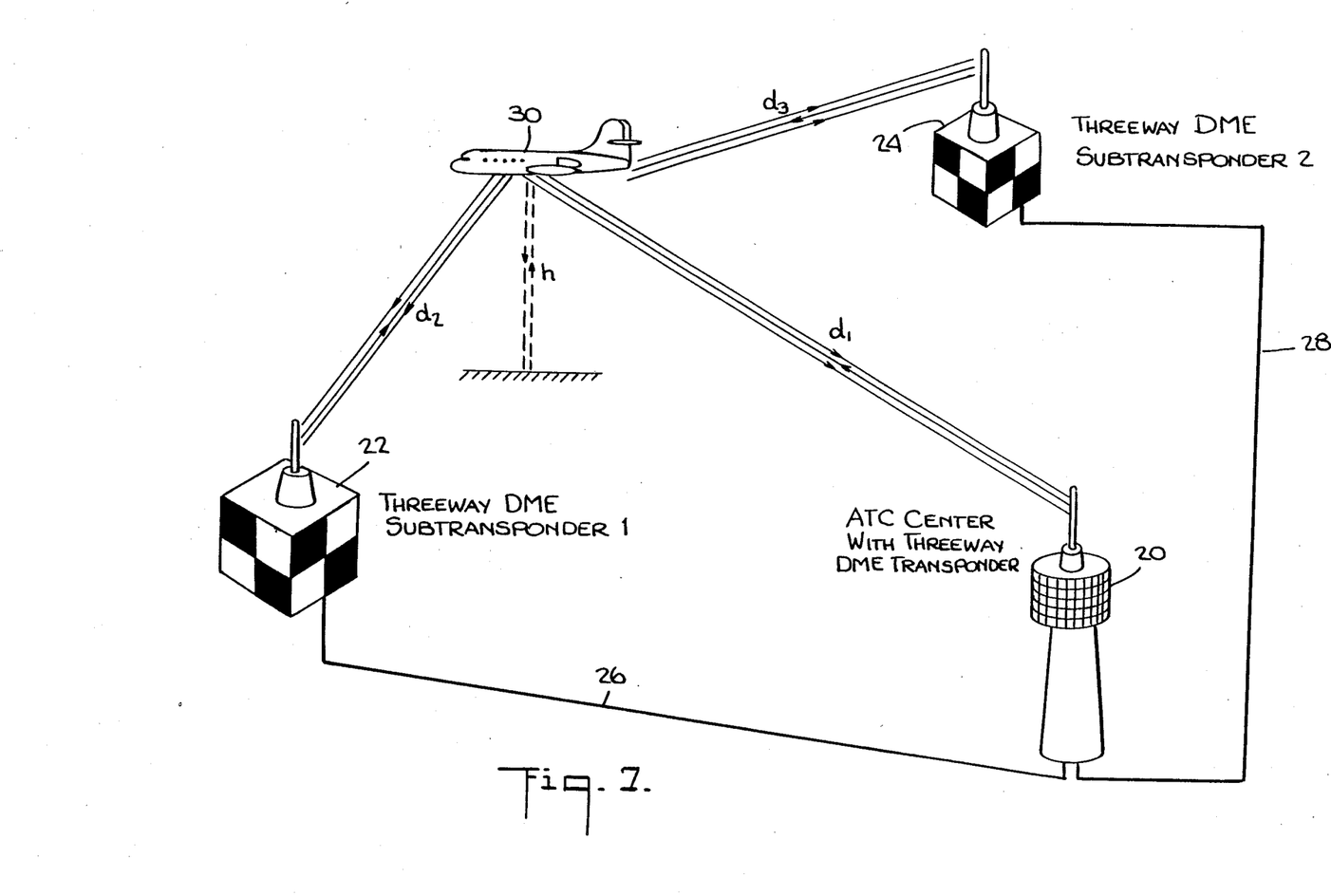
FIG. 7 shows the principle of "scanning" Three Way DME with selective Data transmission board→ground.

In FIG. 7 is shown an embodiment of a scanning TW-DME system being equipped with three TW-DME transponders and for instance may be used in the scenario according to FIG. 6. The system is operating with an ATC center 20, which is equipped with a TW-DME. Locally distant therefrom and also from each other are provided two sub-transponders 22 and 24, which are connected to the ATC via narrow-band wire data links 26, 28. The ATC center 20 is for instance located at Airport Forus, while the sub-transponders 22, 24 are installed on the mountains Stovegolv and Kaldaskniben which are 210 km apart from each other.

The aircraft to be surveyed are equipped with TW-DME instruments, by which is performed a scanning of the transponders on the interrogation frequencies of the transponders 20, 22, 24. The transponders are sequentially interrogated on the ranges $d_1$ to $d_3$. Like with Scanning DME on board of the aircraft, the position of the aircraft is calculated on board from the measured slant ranges and the altitude of the aircraft measured on board.

On the third way the pulses transmitted by the aircraft are received by the transponders where from the travel time of the pulses the slant ranges are calculated in the way described above. The slant ranges and the additional informations are transmitted to the ATC center via the wire data links 26, 28. There is calculated from the measured slant ranges and the altitude h of the aircraft 30 transmitted to at least one of the transponders the position of said aircraft in the computer located in the ATC center. The position determined in this way can then be used for flight survey purposes.

Additionally the azimuth angle of the aircraft can be calculated by means of the computer using the data known in the ATC center. Said azimuth angle is then transmitted to the aircraft via the ground to air link of the TW-DME.

Since in case of this embodiment three complete transmission ranges are existing, all additional information can be transmitted in both directions with respective multiple redundance. It is also possible even to transmit different additional information via different transmission ranges with their different frequencies.

In cases where additional coarse information on the position of the aircraft is existing, for instance topographical information or a flight connection between just two areas like in case of the scenario according to FIG. 5, it can be sufficient to operate with the two sub-transponders 22 and 24 only.

What I claim as my invention and desire to secure by Letters Patent of the United States is:

1. A surveillance system using a 3-way DME and including an aircraft, a central ground station, and at least one ground substation located at a substantial distance from said central ground station and connected with the latter via a respective broad-band link; said surveillance system comprising:

a DME interrogator on said aircraft for transmitting an interrogating first pulse train, and a DME transponder at said central ground station for receiving said first pulse train from said aircraft and for transmitting to said aircraft with a predetermined delay a marked second pulse train in response to said first pulse train;

means associated with said DME interrogator for transmitting from said aircraft to said central ground station on the DME frequency of said first pulse train a third pulse train in response to receipt of said second pulse train from said central ground station, said third pulse train containing within a marking dead time for said DME transponder respective data identifying the aircraft and its altitude, and means associated with said ground substation for receiving said third pulse train from said DME interrogator and for transmitting said third pulse train from said ground substation via the respective broad-band link to said central ground station;

means on board the aircraft and at said central ground station for calculating a primary slant range between the aircraft and said central ground station based on the direct inter-aircraft/central ground station transit times measured for said first and second pulse trains and for said second and third pulse trains, respectively;

computing means at said central ground station for subtracting from (a) the travel times of said third pulse train received by said central ground station from said aircraft via said ground substation and the associated broad-band link (b) the travel times of said third pulse train received by said central ground station from said ground substation via said broad-band link, for calculating a secondary slant range between said aircraft and said ground substation, and for thereafter determining the aircraft position from (i) said primary slant range and said secondary slant range, (ii) the fixed distance between said central ground station and said ground substation to which the associated secondary slant range has been calculated, and (iii) the altitude of the aircraft transmitted in said third pulse train, said two slant ranges and the associated fixed distance forming the three sides of a triangle, and said computing means serving further for calculating the azimuth angle of the aircraft from the aircraft position; and means for transmitting the azimuth angle of the aircraft from said central ground station to the aircraft for navigational purposes in said second pulse train within a coding window delayed in said second pulse train for a period of time longer than said marking dead time.

2. A surveillance system using a 3-way DME and including an aircraft and at least two ground stations located at a substantial distance from each other; said surveillance system comprising:

a DME interrogator on said aircraft for transmitting an interrogating first pulse train, and a respective DME transponder at each of said ground stations for receiving said first pulse train from said aircraft and for transmitting to said aircraft with a predetermined delay a marked second pulse train in response to said first pulse train;

means associated with said DME interrogator for transmitting from said aircraft to said ground stations on the DME frequency of said first pulse train a third pulse train in response to receipt of each of said second pulse trains from the respective ground station, said third pulse train containing within a marking dead time for said DME transponders respective data identifying the aircraft and its altitude, and means associated with each of said ground stations for receiving said third pulse train from said DME interrogator;

first computing means at each of said ground stations for calculating the slant range between the aircraft and the respective ground station based on the direct inter-aircraft/ground station transit time measured for said first and second pulse trains and for said second and third pulse trains, respectively;

second computing means, and respective data links serving to transmit the slant range for each ground station calculated by said first computing means to said second computing means;

said second computing means serving for determining the aircraft position from (i) said two slant ranges between the aircraft and said two ground stations, (ii) the fixed distance between said two ground stations to which the associated slant range has been calculated, and (iii) the altitude of the aircraft transmitted in said third pulse train, said two slant ranges and said fixed distance forming the three sides of a triangle, and said second computing means serving further for calculating the azimuth angle of the aircraft from the aircraft position; and means for transmitting the azimuth angle of the aircraft from at least one of said ground stations to the aircraft for navigational purposes in the respective said second pulse train within a coding window delayed in that second pulse train for a period of time longer than said marking dead time.

3. A surveillance system according to claim 2, and further comprising a third ground station at a substantial distance from each of said at least two ground stations, said third ground station acting as a central ground station including said second computing means and a DME transponder for receiving said first and third pulse trains from said aircraft and for transmitting to said aircraft with a predetermined delay a marked second pulse train in response to said first pulse train and including said coding window for transmitting the azimuth angle.

4. A surveillance system according to claim 3, wherein said third ground station which acts as a central ground station is connected via a wire data link with both of said at least two ground stations and cooperates therewith for determining the aircraft position.

5. A surveillance system according to claim 4, wherein the azimuth angle transmitted to the aircraft is the azimuth angle relative to said third ground station.

* * * * *